United States Patent [19]

Moyer

[11] Patent Number: 5,737,170
[45] Date of Patent: Apr. 7, 1998

[54] THERMAL SHUTDOWN CIRCUIT USING A PAIR OF SCALED TRANSISTORS

[75] Inventor: James C. Moyer, San Jose, Calif.

[73] Assignee: Micrel, Inc., San Jose, Calif.

[21] Appl. No.: 313,480

[22] Filed: Sep. 27, 1994

[51] Int. Cl.$^6$ ..................................................... H02H 5/04
[52] U.S. Cl. .......................... 361/103; 361/106; 361/57; 361/98; 361/71
[58] Field of Search ................................. 361/103–106, 361/54–59, 71, 90–98; 323/313–315; 327/538, 513, 540, 539

[56] References Cited

U.S. PATENT DOCUMENTS

| | | | |
|---|---|---|---|
| 4,092,693 | 5/1978 | Ishikawa et al. | 361/103 |
| 4,574,205 | 3/1986 | Nagano | 361/103 |
| 4,958,122 | 9/1990 | Main | 323/315 |
| 5,266,885 | 11/1993 | Brambilla et al. | 323/313 |

*Primary Examiner*—Jeffrey A. Gaffin
*Assistant Examiner*—Michael J. Sherry

*Attorney, Agent, or Firm*—Skjerven, Morrill, MacPherson, Franklin and Friel; T. Lester Wallace

[57] ABSTRACT

The base of a thermal shutdown bipolar transistor having a $V_{BE(on)}$ which decreases with increasing temperature is biased with a bias voltage $V_{PTATbias}$ which increases proportionally with increasing absolute temperature. By supplying the base of the thermal shutdown transistor with a bias voltage $V_{PTATbias}$ which increases with increasing temperature rather than a bias voltage that remains constant or decreases with increasing temperature, the temperature at which the thermal shutdown transistor turns on is made more predictable and the thermal shutdown transistor is made to turn on more sharply at a desired thermal shutdown temperature. The bias voltage $V_{PTATbias}$ may be generated by driving a current which increases proportionally with increasing absolute temperature across a resistor. Current sources employing feedback control loops are disclosed for generating such a current. Startup current sources are disclosed for starting control loop operation. A hysteresis circuit is disclosed which causes the thermal shutdown transistor to turn on at a relatively high temperature and to turn off at a relatively low temperature.

12 Claims, 17 Drawing Sheets

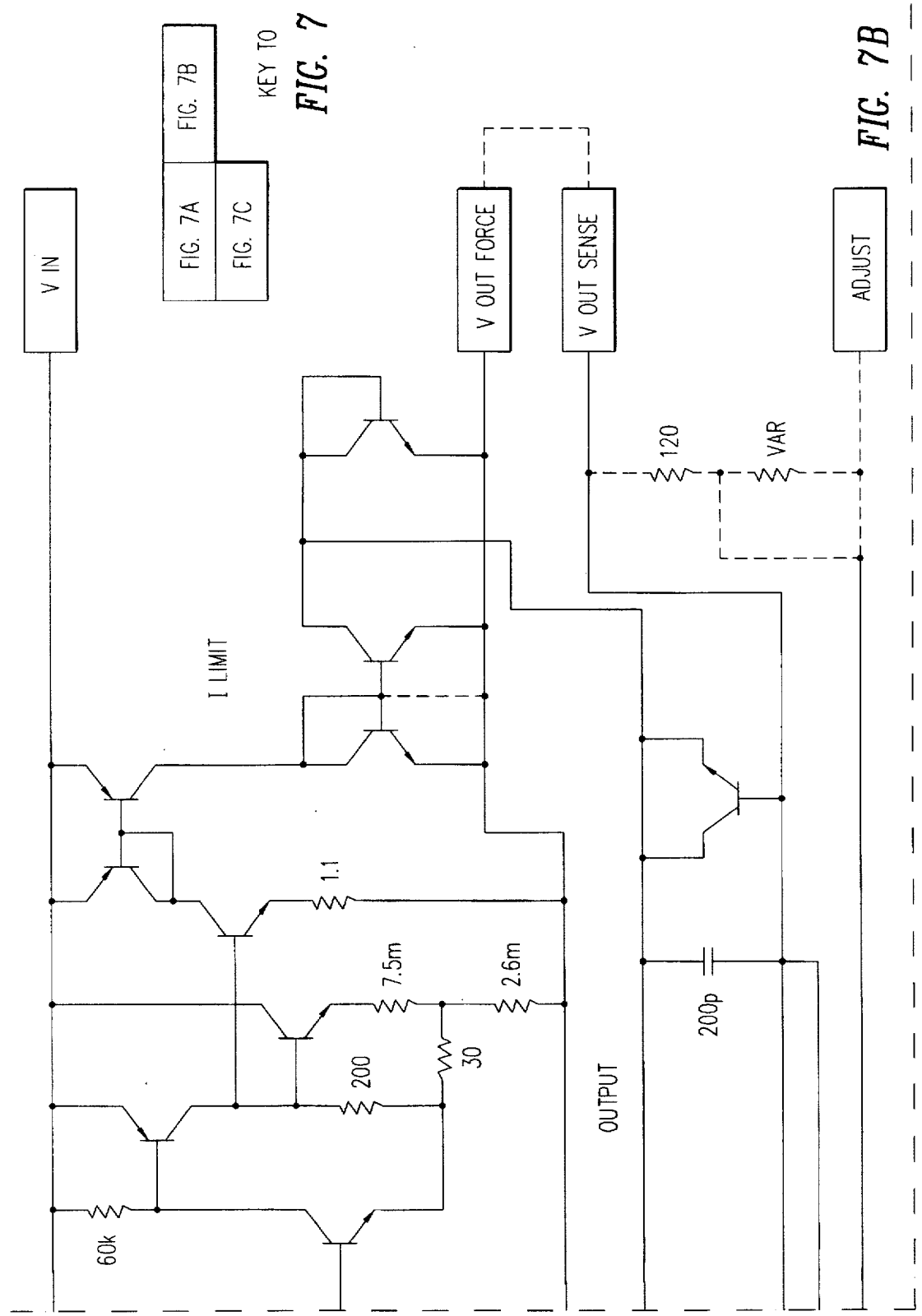

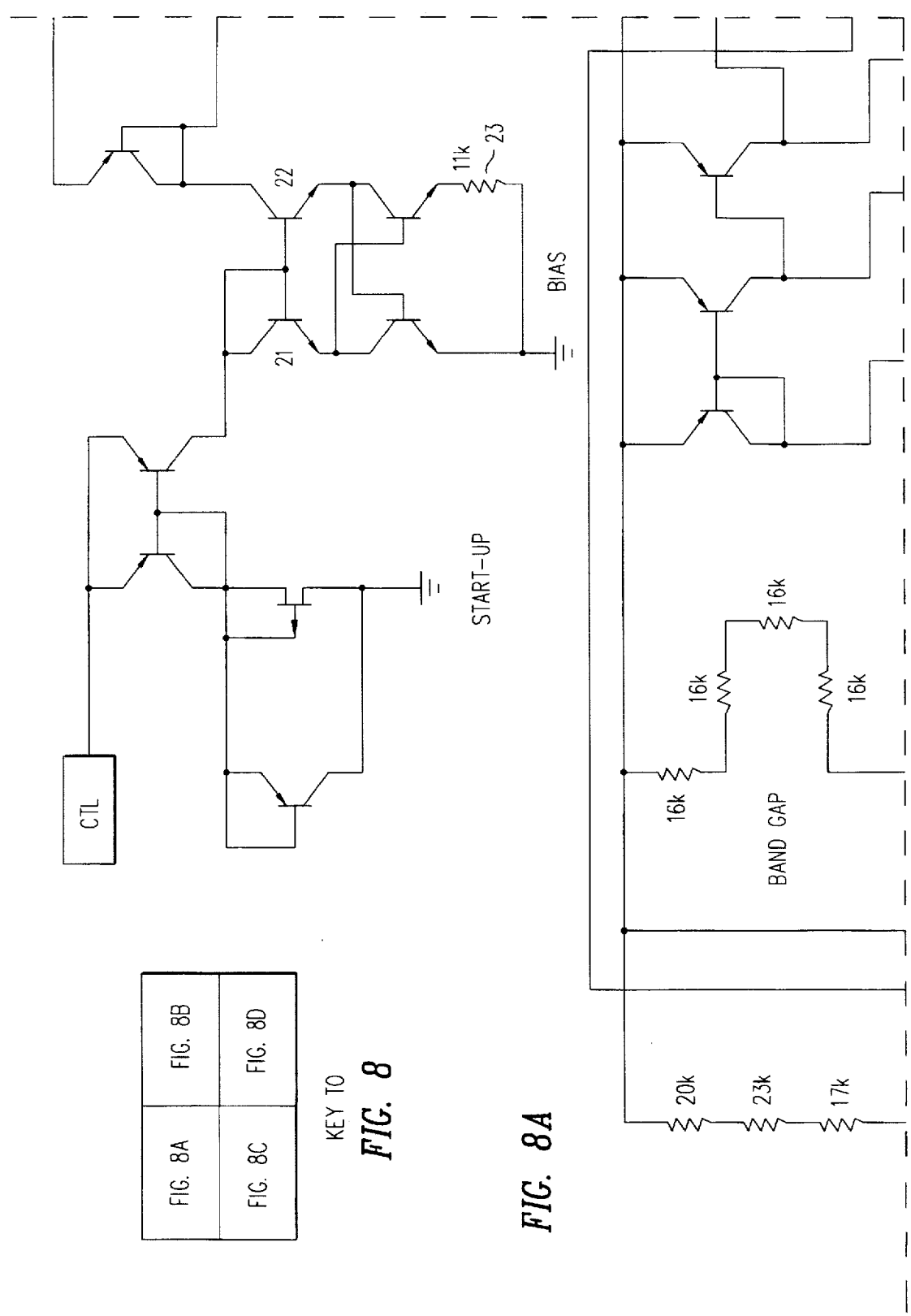

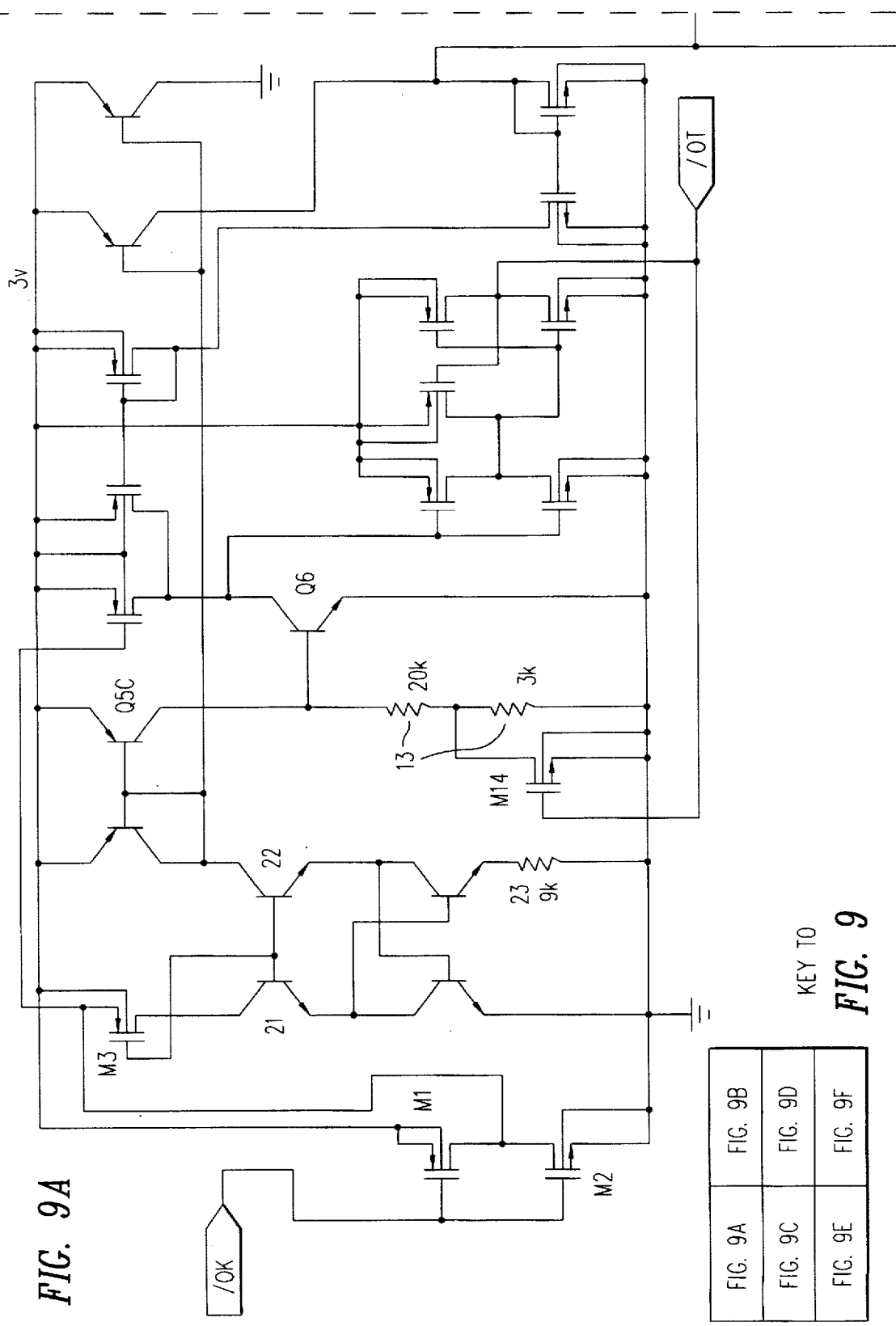

THERMAL SHUTDOWN CIRCUIT USING A PAIR OF SCALED TRANSISTORS

FIELD OF THE INVENTION

This invention relates to thermal shutdown circuits. More particularly, this invention relates to integrated thermal shutdown circuits on integrated circuit chips which do not comprise bandgap voltage reference circuits.

BACKGROUND INFORMATION

FIG. 1 (PRIOR ART) is an illustration of a conventional thermal shutdown circuit 1. A bandgap reference voltage circuit 2 generates a bandgap reference voltage $V_{BG}$ which is substantially constant over a temperature range. The bandgap reference voltage $V_{BG}$ is therefore said to have a zero temperature coefficient over this range. The bandgap reference voltage $V_{BG}$ is divided using a voltage divider comprising resistors 3 and 4 to generate a voltage $V_{BGbias}$ which biases the base of a bipolar thermal shutdown transistor 5. The resistances of resistors 3 and 4 are chosen so that the voltage $V_{BGbias}$ biases the thermal shutdown transistor 5 to be substantially nonconductive over a desired operating temperature range of a circuit to be protected 6.

Because the base-to-emitter turn on voltage ($V_{BE(on)}$) of a bipolar transistor decreases at approximately 2 mV/°C, the voltage on the base of thermal shutdown transistor 5 required to turn transistor 5 on decreases with increasing temperature. When the temperature of the thermal shutdown circuit reaches an undesirably high temperature, the $V_{BE(on)}$ of transistor 5 falls below the bias voltage $V_{BGbias}$. Accordingly, thermal shutdown transistor 5 turns on. Thermal shutdown transistor 5 turning on may, for example, shunt current away from the circuit to be protected 6, thereby preventing circuit 6 from being damaged. The temperature at which thermal shutdown occurs can be chosen by appropriate choice of the resistances of resistors 3 and 4.

FIG. 2 (PRIOR ART) is a graph illustrating the operation of the conventional thermal shutdown circuit of FIG. 1. Line 7 is illustrative of an ideal zero temperature coefficient base bias voltage $V_{BGbias}$ supplied to thermal shutdown transistor 5. Line 8 is illustrative of the $V_{BE(on)}$ of the thermal shutdown transistor 5. The thermal shutdown transistor 5 to a first approximation turns on at the temperature ("thermal shutdown temperature") where the two lines 7 and 8 intersect.

This conventional circuit has several problems. First, a bandgap reference voltage circuit must be realized. This may be somewhat involved and may result in a significant amount of silicon area being consumed. Second, the small angle between the lines 7 and 8 results in the thermal shutdown temperature being somewhat unrepeatable across a production spread. The thermal shutdown transistors of two seemingly identical integrated circuits may, for example, turn on at different temperatures due to process and geometry variations from die to die and/or wafer to wafer. Third, the bandgap reference voltage output by a real bandgap reference voltage circuit may not actually have a zero temperature coefficient at high temperatures. Line 9 is illustrative of a decrease in a bias voltage $V_{BGbias}$ generated using a real bandgap reference voltage circuit at high temperatures. The smaller angle between the lines 8 and 9 results in an even less predictable thermal shutdown temperature. A thermal shutdown circuit is therefore desired which is more easily realized and/or has a more predictable thermal shutdown temperature.

SUMMARY

A bias voltage $V_{PTATbias}$ having a magnitude which increases proportionally with increasing absolute temperature is supplied to the base of bipolar shutdown transistor which has a $V_{BE(on)}$ which decreases with increasing absolute temperature. The angle between the bias voltage and the $V_{BE(on)}$ of the shutdown transistor over temperature is therefore larger resulting in a more predictable thermal shutdown temperature.

In some embodiments, the bias voltage for the shutdown transistor is generated by flowing the current from a current source over a first resistor of resistance R1. The current output from the current source has a magnitude which increases proportionally with increasing absolute temperature. In some embodiments, the current source involves a scaled transistor pair and a second resistor, the current being output from the current source having a magnitude of $V_{PTAT}/R2$, where $V_{PTAT}$ is a voltage difference between the voltages on the emitters of the scaled transistor pair which increases proportionally with increasing absolute temperature, and where R2 is the resistance of the second resistor. In some embodiments, the first and second resistors are like resistors realized using the same processing steps on the same integrated circuit. A feedback control loop inside the current source maintains proper current source operation. In some embodiments, a startup circuit is provided in the feedback control loop. In some embodiments, a hysteresis circuit is provided to reduce the thermal shutdown temperature ("trip" temperature) once the thermal shutdown has occurred. Multiple current sources for generating currents having magnitudes which increase proportionally with increasing absolute temperature are disclosed.

BRIEF DESCRIPTION OF THE DRAWINGS

FIG. 7 comprising FIGS. 7A, 7B and 7C is a detailed circuit diagram in accordance with a specific embodiment of the present invention.

FIG. 8 comprising FIGS. 8A, 8B, 8C and 8D is a detailed circuit diagram in accordance with another specific embodiment of the present invention.

FIG. 9 comprising FIGS. 9A, 9B, 9C, 9D, 9E, and 9F is a detailed circuit diagram in accordance with yet another specific embodiment of the present invention.

DETAILED DESCRIPTION OF THE PREFERRED EMBODIMENTS

Figure 3:
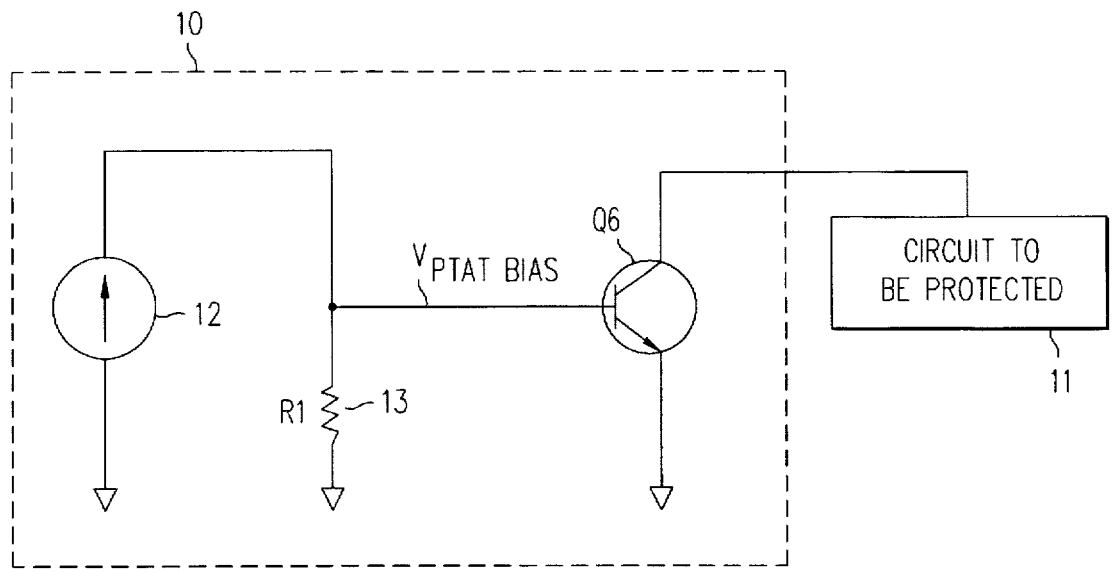
FIG. 3 is a simplified circuit diagram in accordance with an embodiment of the present invention.

FIG. 3 is a simplified circuit diagram in accordance with an embodiment of the present invention. To simplify the explanation it is assumed that the resistances of all resistors are constant with temperature. In the actual embodiment, circuit operation depends on the ratio of resistors so that the effects of their temperature coefficients are effectively canceled.

A thermal shutdown circuit 10 and a circuit to be protected 11 are realized on the same integrated circuit chip. A bias voltage $V_{PTATbias}$ having a magnitude which increases with increasing absolute temperature is generated by a current source 12 and a resistor 13. The magnitude of the current output by the current source 12 increases with increasing absolute temperature. The current from current source 12 is made to flow through resistor 13 of resistance R1 in order to generate the bias voltage $V_{PTATbias}$ which biases the base of a bipolar shutdown transistor Q6.

Figure 1:
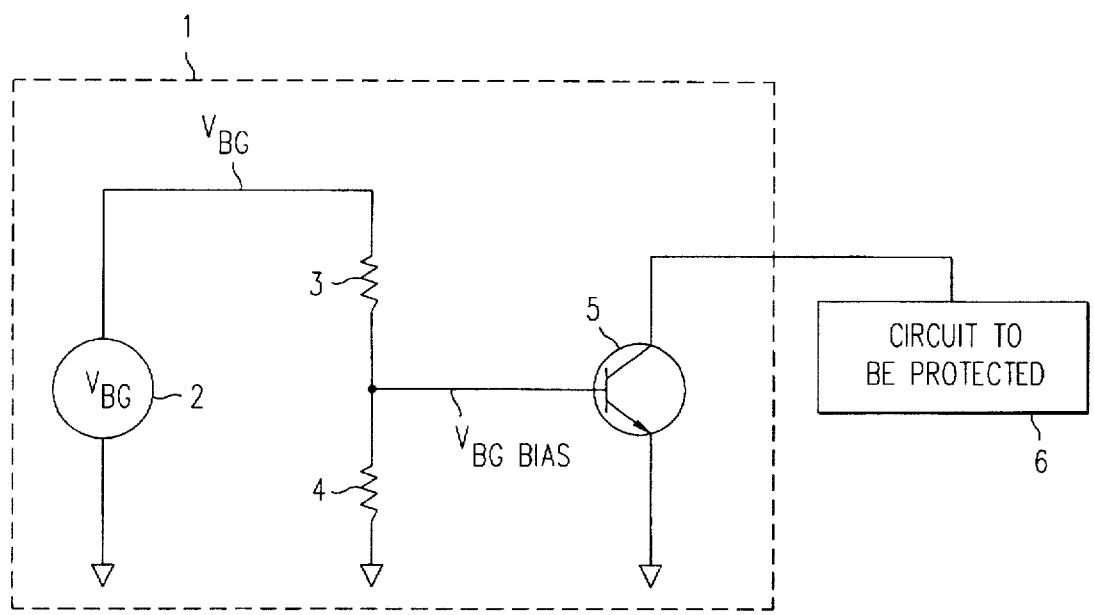
FIG. 1 (PRIOR ART) is a simplified diagram of a conventional thermal shutdown circuit coupled to a circuit to be protected.
Figure 2:
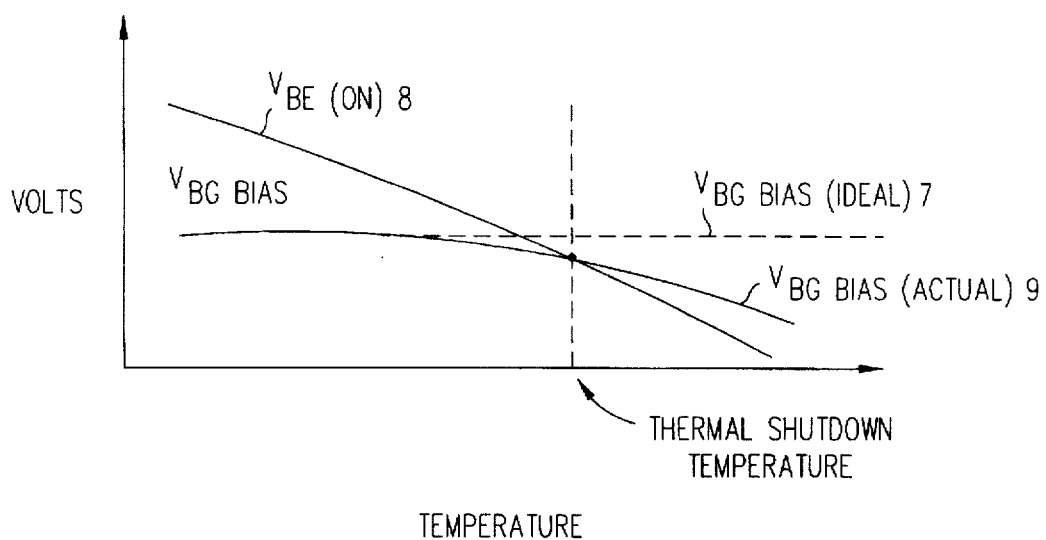
FIG. 2 (PRIOR ART) is a graph illustrating the operation of the conventional thermal shutdown circuit of FIG. 1.
Figure 4:
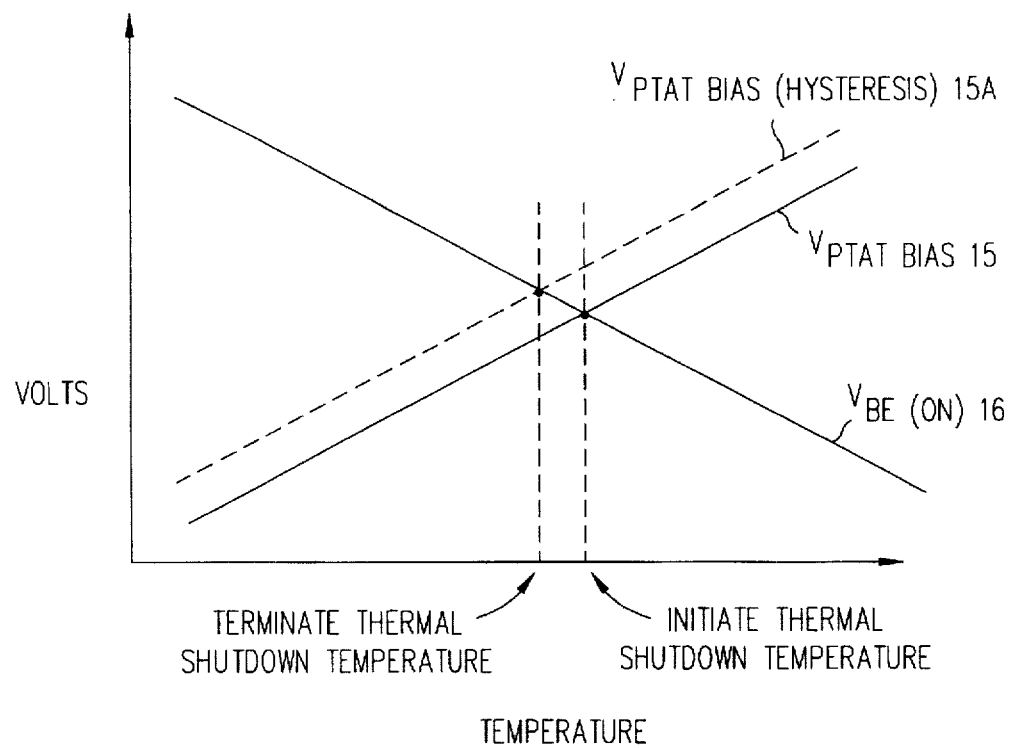
FIG. 4 is a graph illustrating an operation of the circuit of FIG. 3.

FIG. 4 is a graph illustrating an operation of the circuit of FIG. 3. Line 15 illustrates bias voltage $V_{PTATbias}$ increasing with increasing absolute temperature. Line 16 illustrates the base-to-emitter turn on voltage $V_{BE(on)}$ of shutdown transistor Q6 decreasing with increasing absolute temperature. Because the bias voltage $V_{PTATbias}$ in FIG. 4 increases with temperature as opposed to being substantially constant as bias voltage $V_{BGbias}$ in the circuit of FIG. 1, the angle between the bias voltage and the base-to-emitter turn on voltage is greater resulting in a more predictable thermal shutdown temperature.

Figure 5:
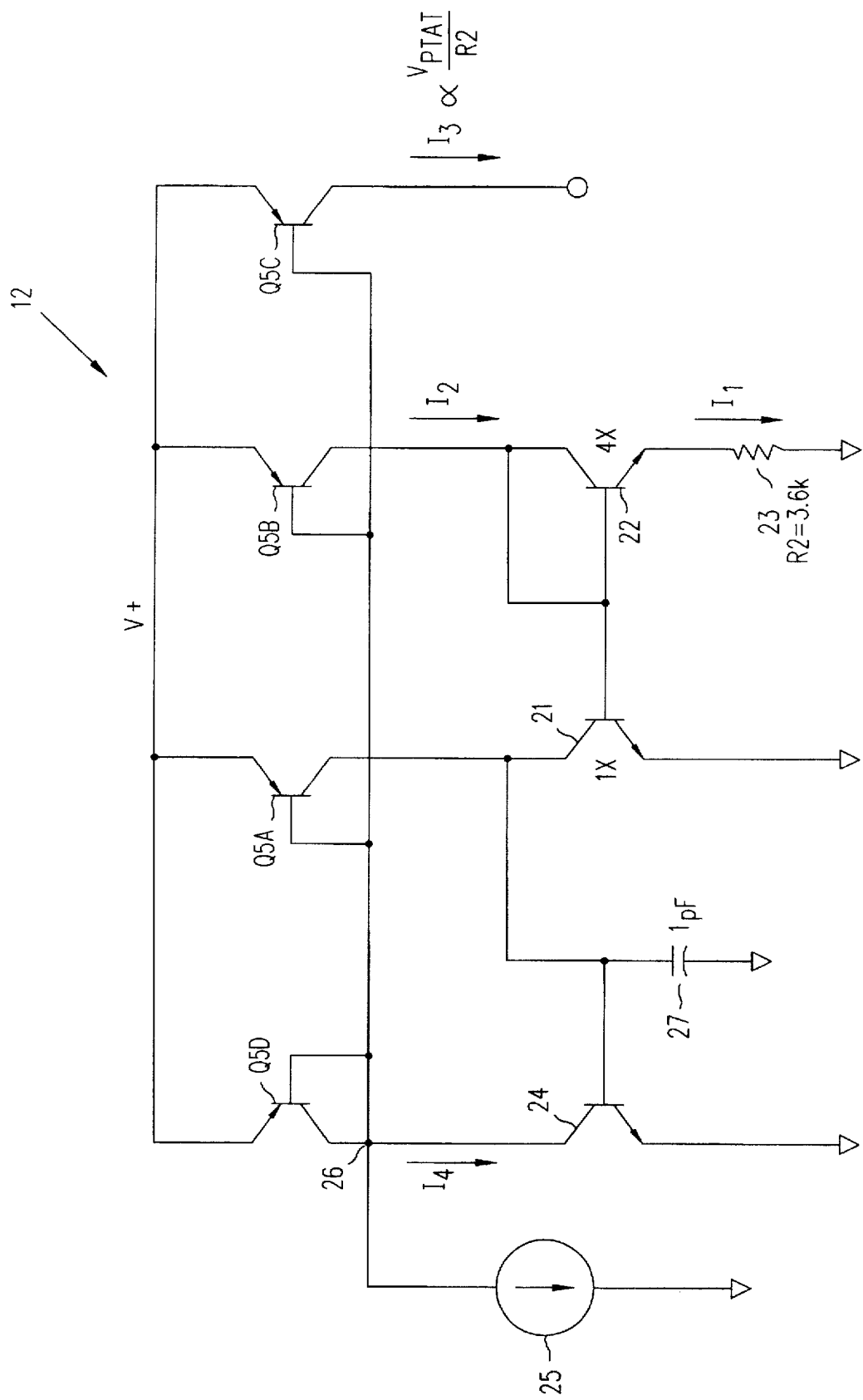
FIG. 5 is a simplified circuit diagram of one possible current source in accordance with an embodiment of the present invention.

FIG. 5 is a simplified circuit diagram of one possible realization of current source 12 in accordance with an embodiment of the present invention. PNP bipolar transistors Q5A-Q5D form a first current mirror. NPN bipolar transistors 21 and 22 form a second current mirror. The 4× and 1× denote that transistors 22 and 21 are scaled such that the emitter area of transistor 22 is four times as large as the emitter area of transistor 21. A resistor 23 of resistance R2 is connected between the emitter of transistor 22 and ground. Because the bases of transistors 21 and 22 are connected together, the voltage across resistor 23 is equal to the $V_{BE(on)}$ of transistor 21 minus the $V_{BE(on)}$ of transistor 22. Because transistors 21 and 22 are like transistors which are scaled to each other, the voltage dropped across resistor 23 increases with increasing temperature. Accordingly, the current $I_1$ increases with increasing temperature. If the collector current of transistor 22 $I_2$ is equal to the emitter current $I_1$ and if transistors 19 and 20 are a current mirror, then the current $I_3$ will also increase with increasing temperature. In FIG. 5, the voltage difference between the $V_{BE(on)}$ of 1× transistor 21 and the $V_{BE(on)}$ of 4× transistor 22 is denoted "$V_{PTAT}$" to indicate that the difference is substantially proportional to absolute temperature.

A control loop is provided to maintain the currents $I_1$ and $I_2$ substantially equal to each other. If, for example, current $I_2$ is greater than current $I_1$, then some of current $I_2$ will flow into the base of transistor 21. The collector current of transistor 21 therefore increases and the voltage on the collector of transistor 21 decreases. Because the collector of transistor 21 is coupled to the base of a transistor 24, the base voltage of transistor 24 is decreased thereby reducing the amount of collector current $I_4$ flowing into the collector of transistor 24. The reduction in current $I_4$ is mirrored by the current mirror comprising transistors Q5A-Q5D to reduce current $I_2$, thereby reducing the magnitude of current $I_2$ to be equal to the magnitude of current $I_1$. If, on the other hand, the current $I_2$ is smaller than current $I_1$, then less current flows into the base of transistor 21 due to some of that current being conducted to ground through resistor 23. Accordingly, the voltage on the collector of transistor 21 increases, thereby raising the voltage on the base of transistor 24, thereby increasing the collector current $I_4$. The current mirror Q5A-Q5D then mirrors the increase in current $I_4$ to current $I_2$, thereby increasing the magnitude of current $I_2$ to be equal to the magnitude of current $I_1$.

A start up current source 25 is provided to pull current from node 26 during a startup condition of the current source. Once the feedback loop is properly regulating current $I_2$, the startup current source 25 is disabled and does not conduct current from node 26. A loop compensation capacitor 27 is provided to establish a dominant pole in the Bode plot of the control loop.

Figure 6:
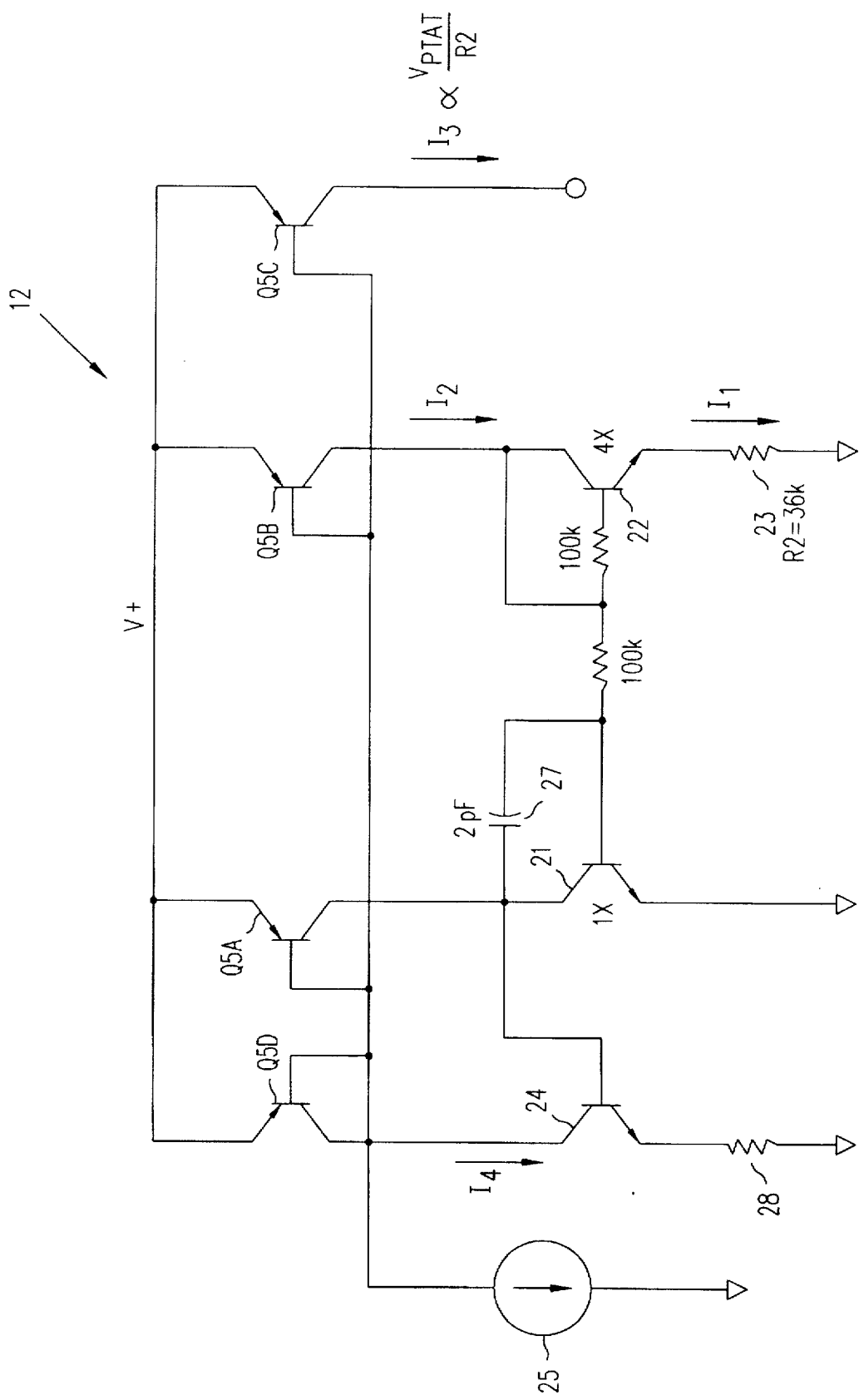
FIG. 6 is a simplified circuit diagram of another possible current source in accordance with an embodiment of the present invention.

FIG. 6 is a simplified diagram of another possible realization of current source 12 of FIG. 3. Like reference numerals indicate like circuit components. Resistor 28 is optional. The loop compensation capacitor 27 is located differently in the embodiments of FIGS. 5 and 6. Using the circuits of FIGS. 5 and 6, the bias voltage $V_{PTATbias}$ is equal to product of the current output from current source 12 and the resistance R1 of resistor 13. $V_{PTATbias}$ therefore is proportional to $(V_{PTAT}/R2)R1$. In accordance with some embodiments of the present invention, resistors 23 and 13 are made of like material and are made in the same processing steps at the same time on the same die so that the temperature-to-resistance characteristics of the two resistors are similar and cancel each other in the $(V_{PTAT}/R2)R1$ equation. For example, resistors 23 and 13 may both be made of base diffusion material made in the same processing steps, may both be made of implanted resistor material made in the same processing steps, and may both be made of P-well material made in the same processing steps.

Figure 7A:
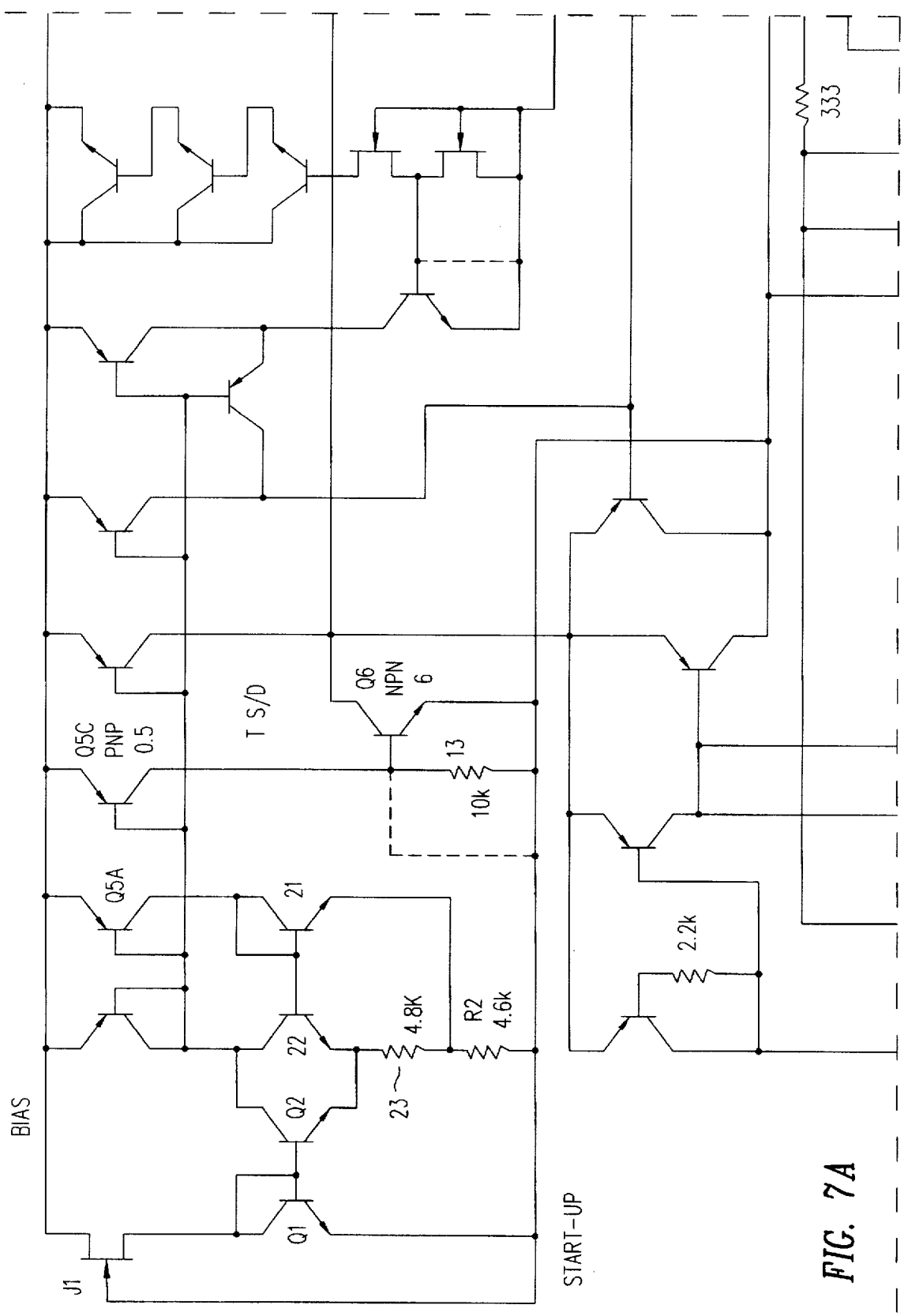
Figure 7C:
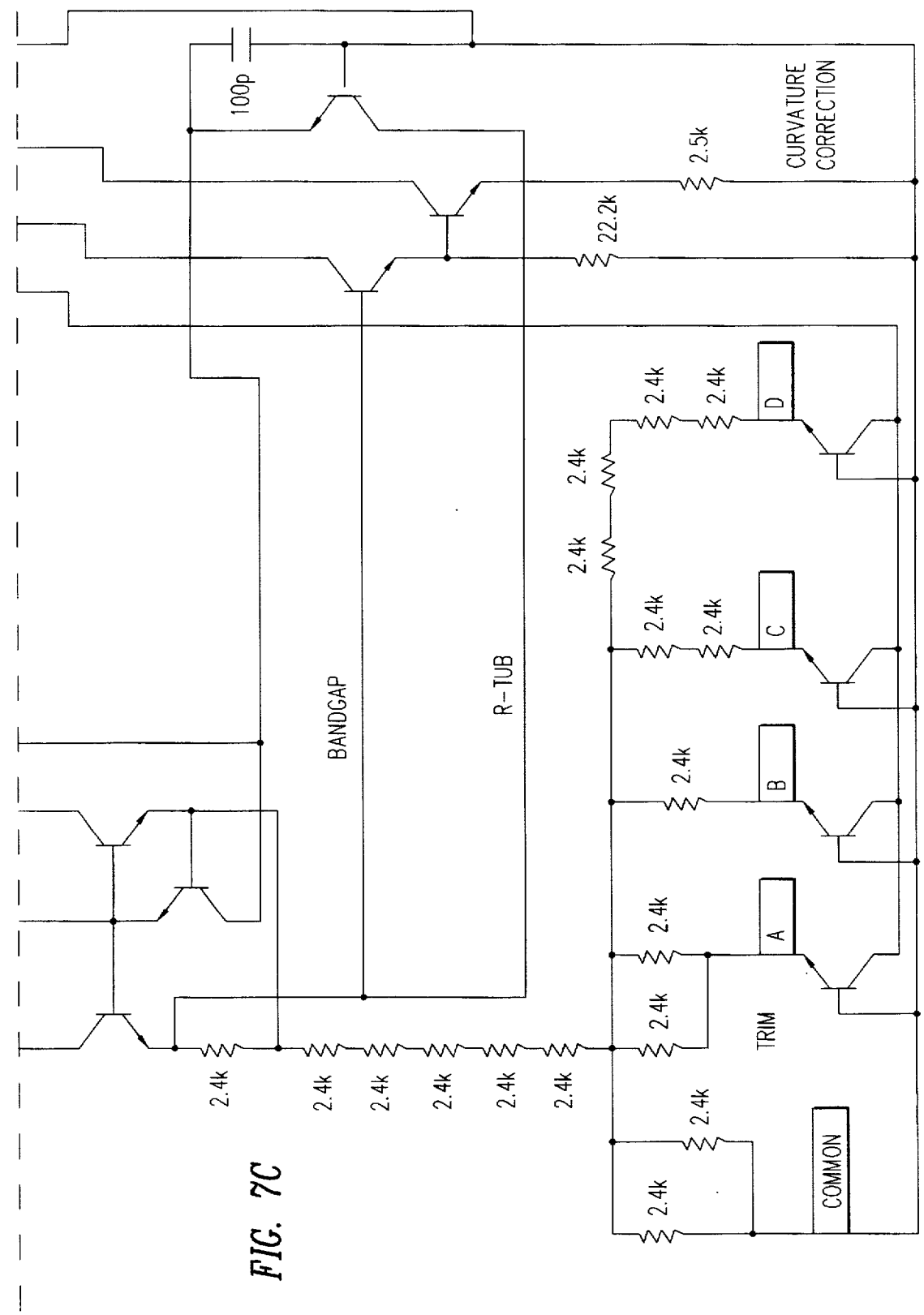

FIG. 7 is a detailed circuit diagram showing a thermal shutdown circuit employed in a voltage regulator integrated circuit in accordance with an embodiment of the present invention. Transistors Q1, Q2 and J1 form a startup current source. Transistors 22 and 21 are scaled current mirror transistors, transistor 22 having an emitter area which is ten times as great as the emitter area of transistor 21. Transistors Q5A and Q5C are part of a current mirror corresponding with the current mirror of transistors Q5A-Q5D of FIG. 5. Voltage $V_{PTAT}$ is developed across resistor 23. Transistor Q6 is a thermal shutdown transistor. The current source is regulated by a feedback loop extending from the collector of transistor 22, through transistor Q5A and back to the collector and base of transistor 21. This feedback loop is small and therefore requires no additional capacitor for compensation.

Figure 8B:
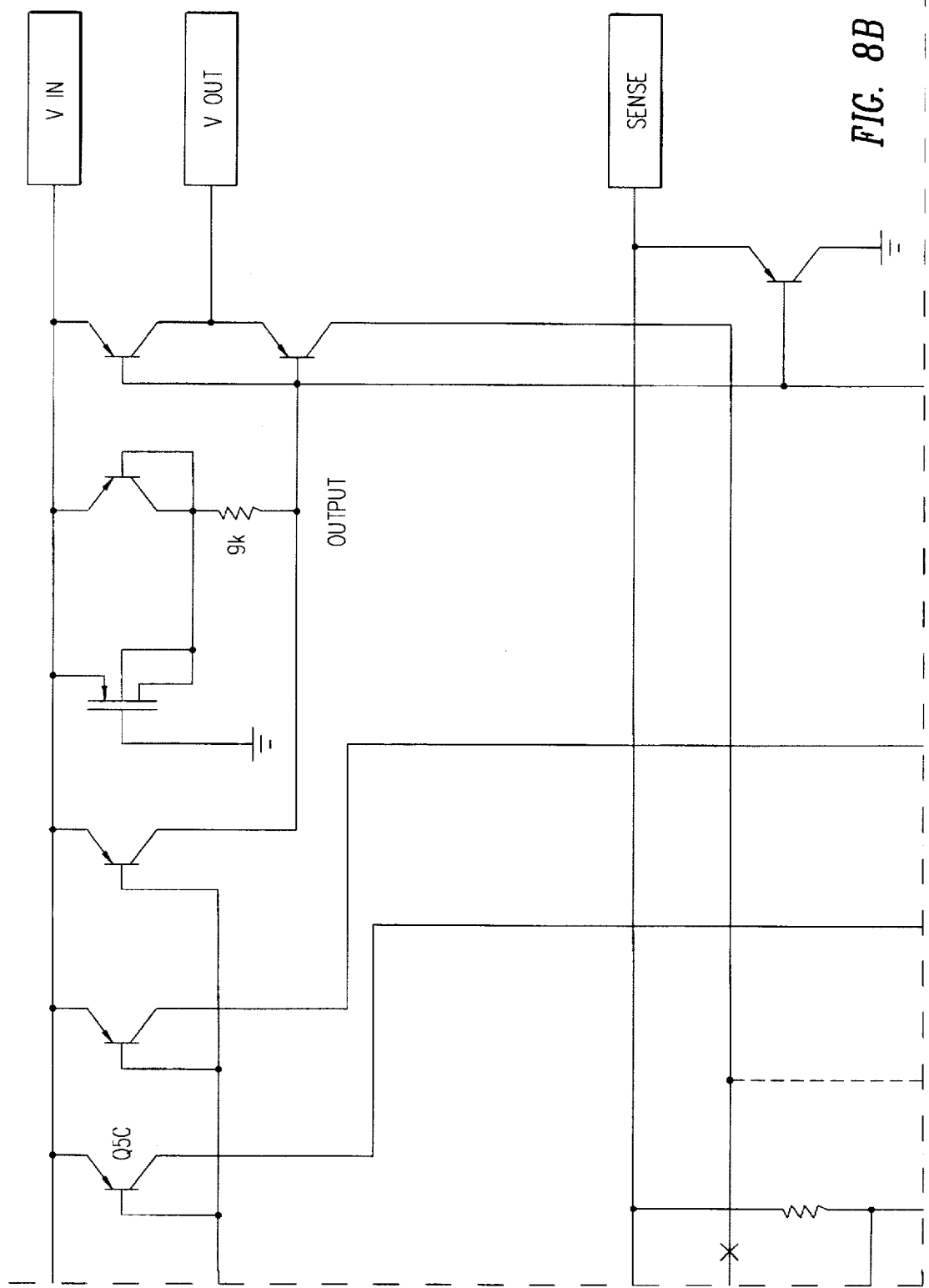
Figure 8C:
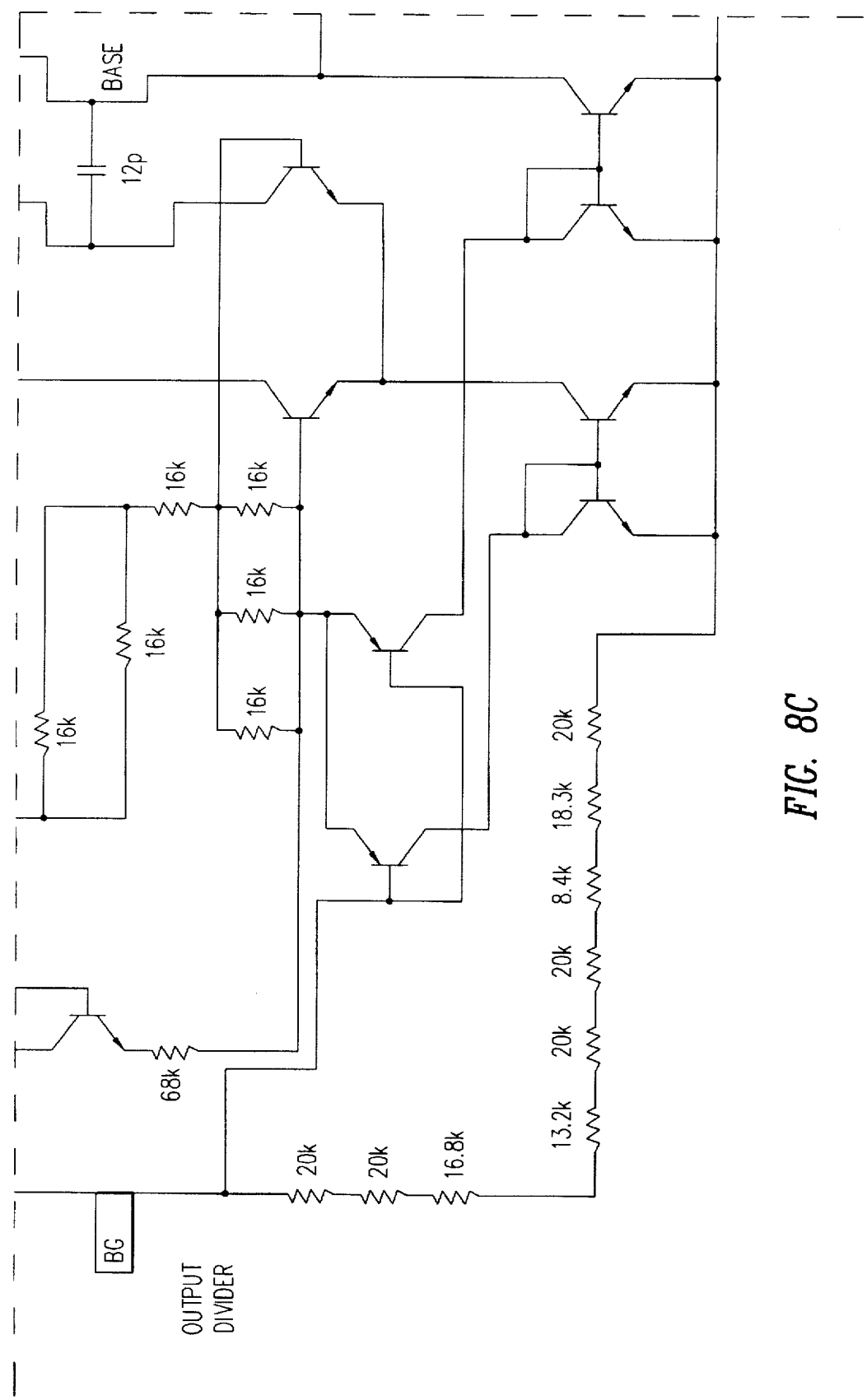
Figure 8D:
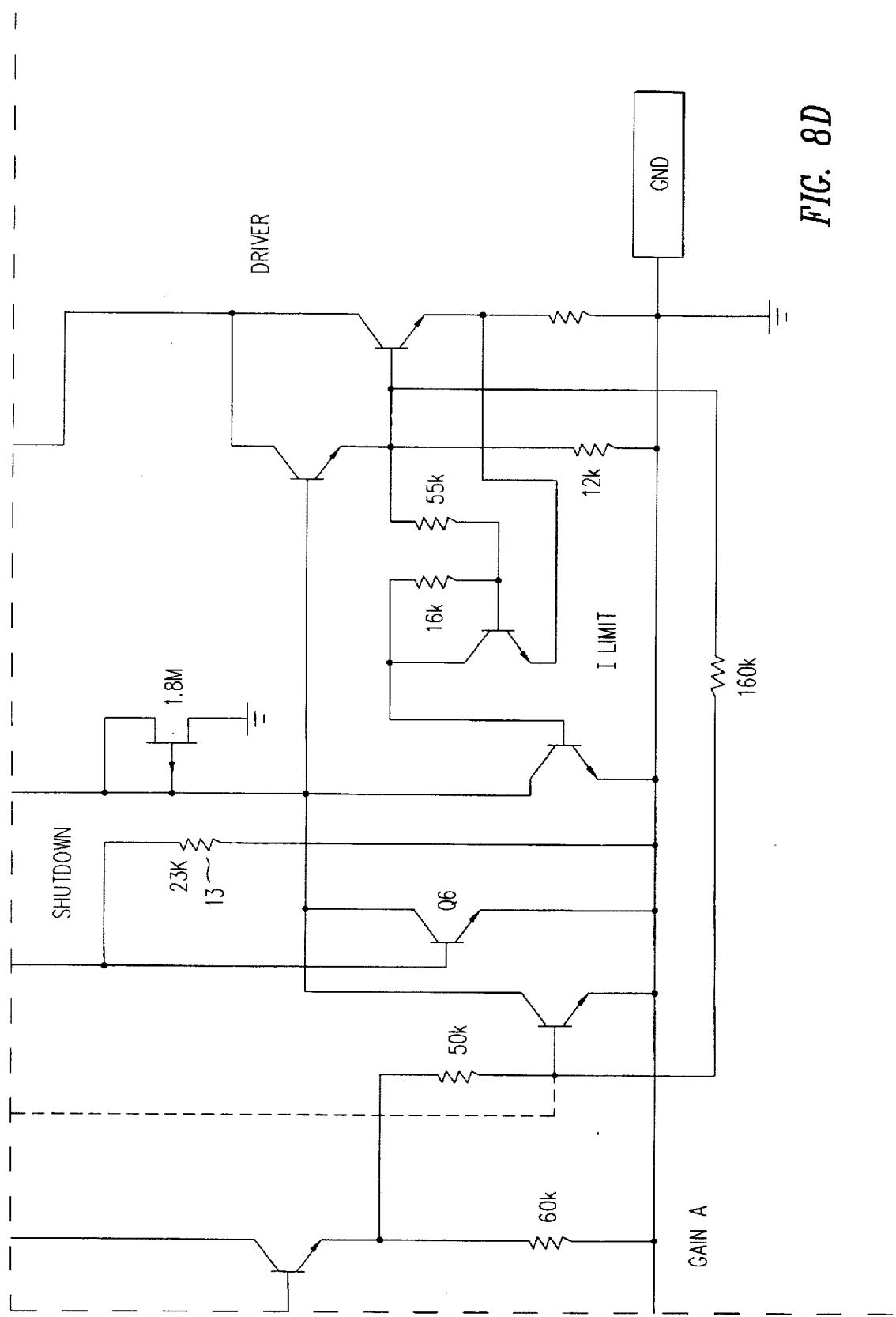
Figure 9B:
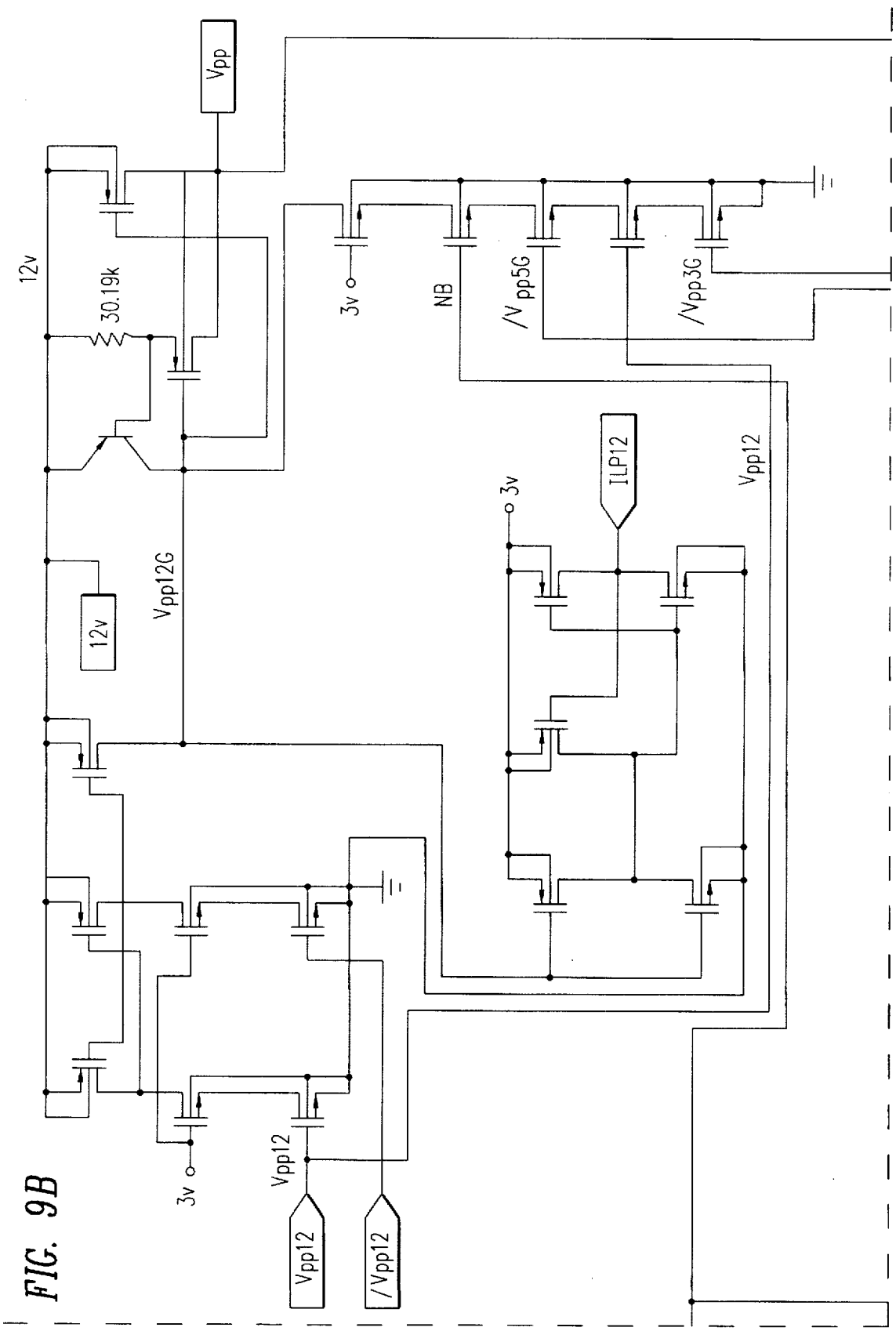
Figure 9C:
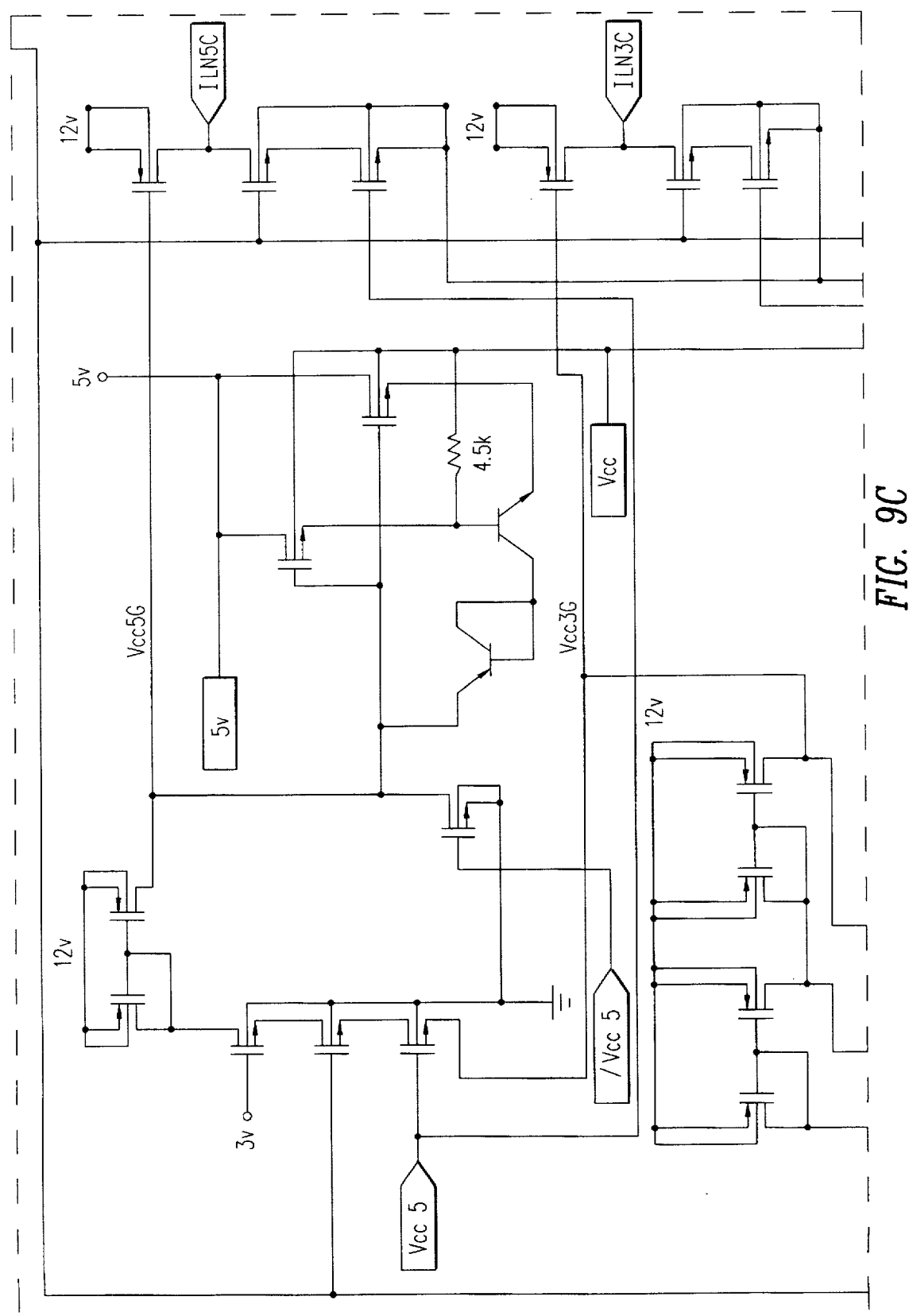
Figure 9D:
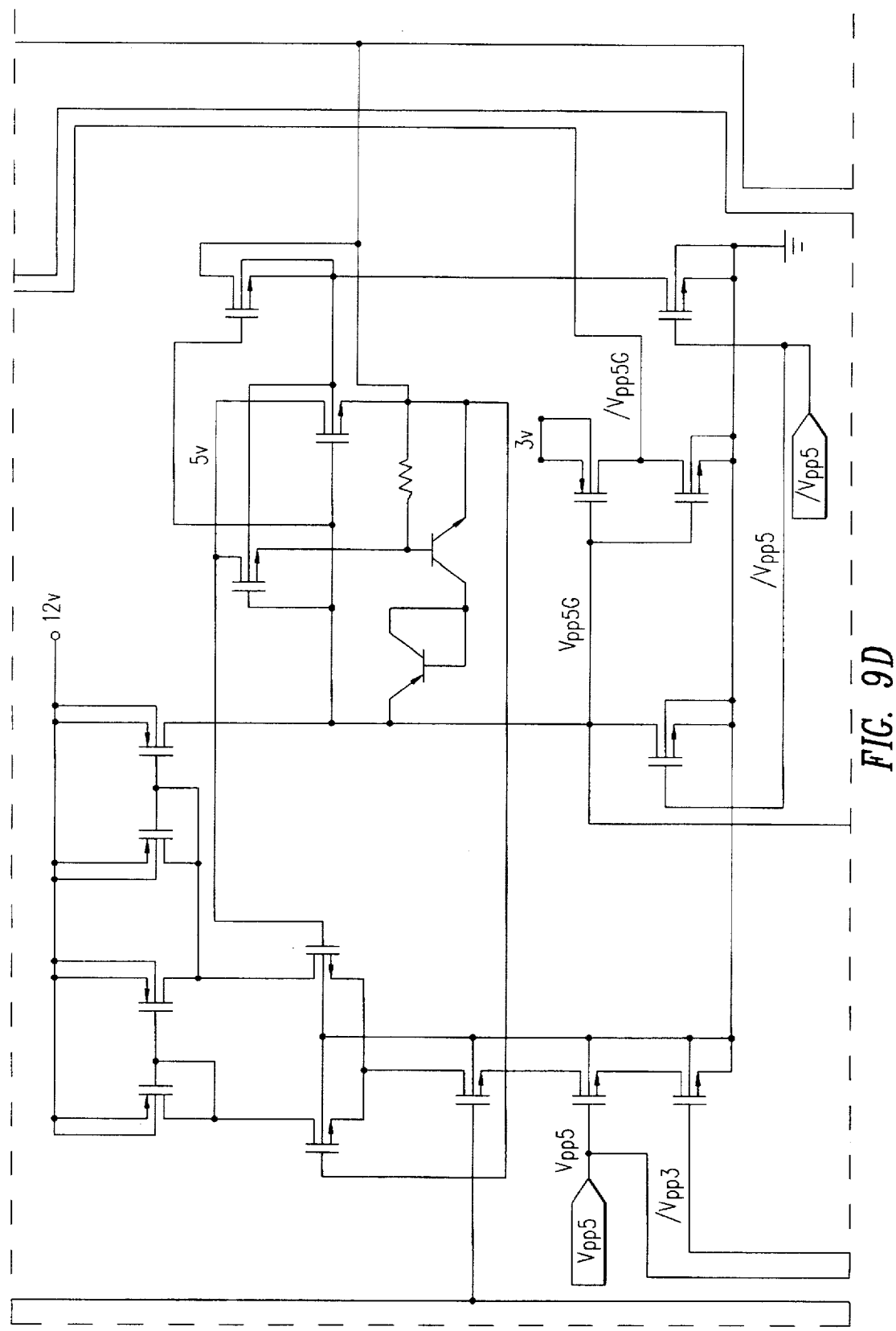
Figure 9E:
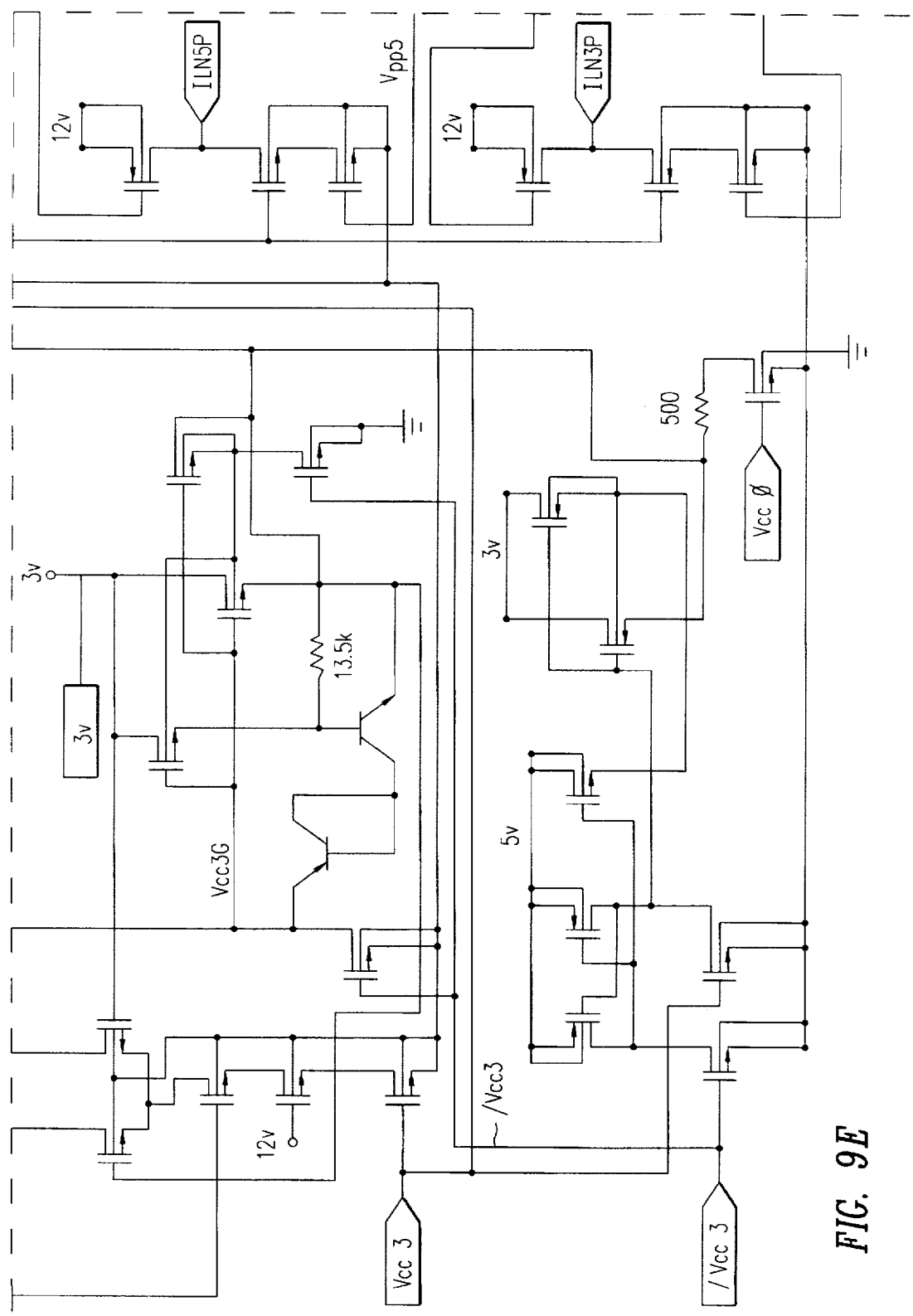
Figure 9F:
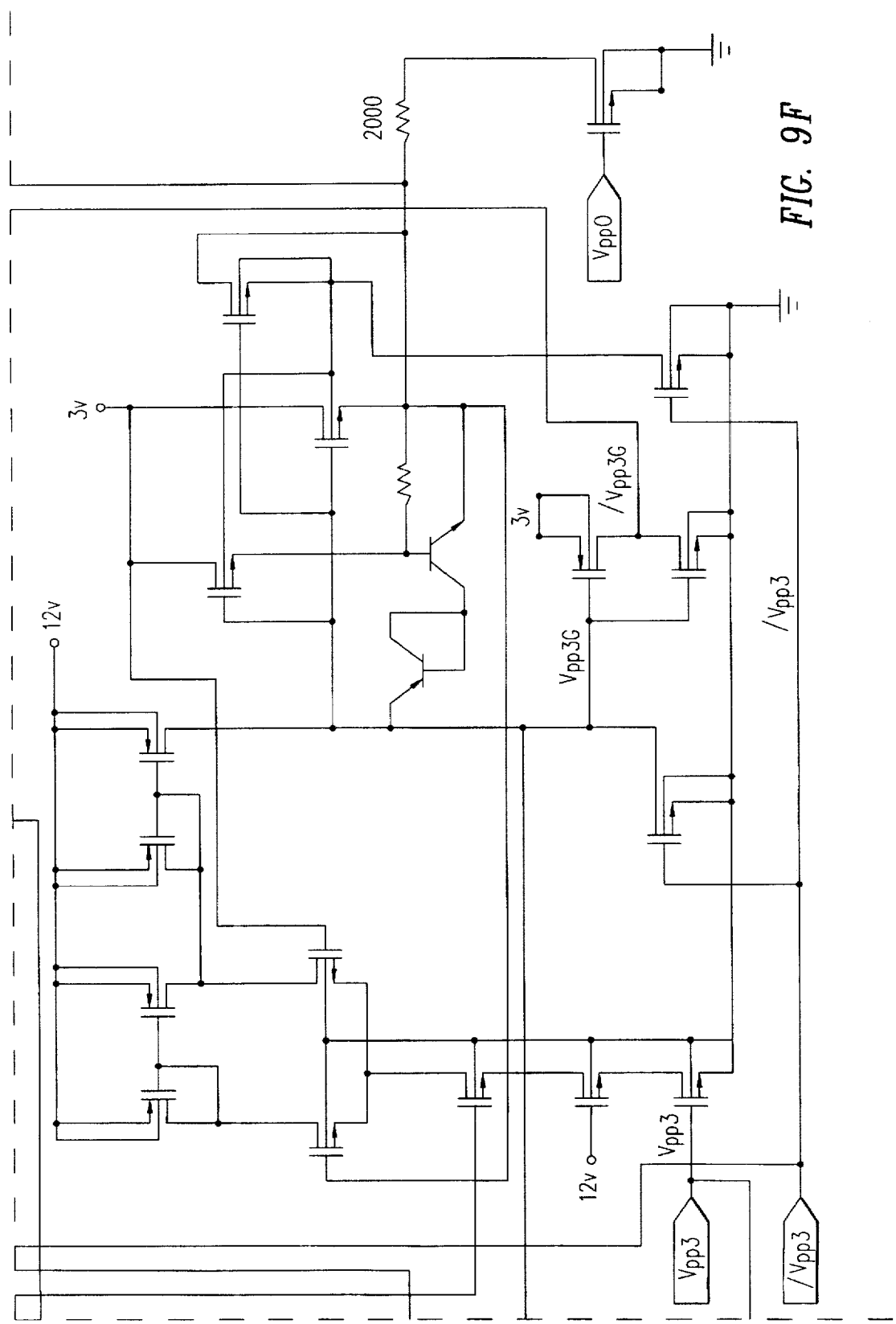

FIG. 8 is a detailed circuit diagram showing a thermal shutdown circuit employed in a voltage regulator integrated circuit in accordance with an embodiment of the present invention. Transistors 21 and 22 are scaled transistors which form a current mirror. Voltage $V_{PTAT}$ is developed across resistor 23. Transistor Q6 is a thermal shutdown transistor.

FIG. 9 is a detailed circuit diagram showing a thermal shutdown circuit employed in a power multiplexer integrated circuit in accordance with an embodiment of the present invention. Transistors 21 and 22 are scaled transistors which form a current mirror. Transistor Q5A is part of a current mirror which corresponds to transistors Q5A-Q5D in FIG. 5. Voltage $V_{PTAT}$ is developed across resistor 23. Resistor 13 of FIG. 9A corresponds with resistor 13 of FIG. 3. Transistor Q6 is a thermal shutdown transistor. Transistors M1 and M2 operate in conjunction with transistor M3 to form a startup current source. Transistor M14 is a hysteresis switch which turns off once thermal shutdown transistor Q6 is turned on. Transistor M14 turning off increases the resistance through which the biasing current proportional to absolute temperature passes. The bias voltage on the base of transistor Q6 is therefore increased once thermal shutdown occurs so that the $V_{BE(on)}$ required to turn shutdown transistor Q6 off is greater. As a result, a lower temperature is required to turn the thermal shutdown transistor off and resume normal circuit operation that is required to turn it on at the beginning of a thermal shutdown condition. Line 15A in FIG. 4 illustrates the shifting upward of the $V_{PTATbias}$ line to create an "initiate thermal shutdown temperature" at a relatively higher temperature and a "terminate thermal shutdown temperature" at a relatively lower temperature.

Although the present invention has been described in connection with certain exemplary embodiments, the present invention is not limited thereto. Numerous current source structures which generate currents which increase with temperature can be employed. Additionally, numerous voltage sources which generate voltages which increase with temperature can be employed. The present invention is not limited to current and/or voltage sources which generate currents and/or voltages which vary proportionally with absolute temperature. Non-linear current and/or voltage to temperature sources can be employed in accordance with the present invention. It is to be understood, therefore, that various changes, modifications, and adaptations of the above described embodiments may be practiced without departing from the scope of the invention as set forth in the appended claims.

What is claimed is:

1. An integrated circuit, comprising:

a current source having an output terminal, said current source supplying a current onto said output terminal which increases substantially proportionally to an increasing absolute temperature;

a first resistor having a first terminal and a second terminal, said first terminal of said first resistor being coupled to said output terminal of said current source;

a thermal shutdown transistor having an emitter, a base, and a collector, said base being connected to said first terminal of said first resistor, said emitter being connected to said second terminal of said first resistor; and a hysteresis circuit which changes the resistance of said first resistor after said thermal shutdown transistor turns on in a thermal shutdown condition.

2. The integrated circuit of claim 1, further comprising: a power multiplexer.

3. An integrated circuit, comprising:

a current source having an output terminal, said current source supplying a current onto said output terminal which increases substantially proportionally to an increasing absolute temperature;

a first resistor having a first terminal and a second terminal, said first terminal of said first resistor being coupled to said output terminal of said current source; and a thermal shutdown transistor having an emitter, a base, and a collector, said base being connected to said first terminal of said first resistor, said emitter being connected to said second terminal of said first resistor, wherein said current source comprises:

a first transistor having a base, an emitter, and a collector;

a second resistor having a first terminal and a second terminal, said first terminal being coupled to said emitter of said first transistor;

a second transistor having a base, an emitter, and a collector, said first and second transistors being like transistors, said second transistor being smaller than said first transistor, said emitter of said second transistor being coupled to said second terminal of said second resistor;

a control loop circuit which regulates a current flowing into said collector of said first transistor; and a current mirror comprising a first mirror transistor conducting said current flowing into said collector of said first transistor and a second mirror transistor which outputs said current onto said output terminal of said current source.

4. The integrated circuit of claim 3, wherein said bases of said first and second transistors of said current source are resistively coupled together.

5. The integrated circuit of claim 3, wherein said bases of said first and second transistors of said current source are directly connected together.

6. The integrated circuit of claim 3, said first terminal of said second resistor being coupled to said emitter of said first transistor via a third transistor, said emitter of said second transistor being coupled to said second terminal of said second resistor via a fourth transistor, a base of said third transistor being connected to said emitter of said second transistor, a base of said fourth transistor being connected to said emitter of said first transistor.

7. The integrated circuit of claim 3, wherein said current source further comprises a start up circuit which causes a current to flow through at least one of said first and second transistors of said current source during a start up condition.

8. The integrated circuit of claim 3, wherein said integrated circuit has a first input terminal I1, a second input terminal I2 and an output terminal O, said integrated circuit further comprising:

a power multiplexer coupled to said first and second input terminals I1 and I2 of said integrated circuit and to said output terminal O of said integrated circuit.

9. The integrated circuit of claim 3, wherein said second resistor has a resistance R2, said current having a magnitude which is proportional to $V_{PTAT}/R2$, where $V_{PTAT}$ is a voltage which increases substantially proportionally with said absolute temperature.

10. The integrated circuit of claim 9, wherein said first resistor and said second resistor are both formed in the same base diffusion processing step.

11. The integrated circuit of claim 9, wherein said first resistor and said second resistor are both formed in the same resistor implant processing step.

12. The integrated circuit of claim 9, wherein said first resistor and said second resistor are both formed in same well forming processing step.

* * * * *